Figures 1, 2:
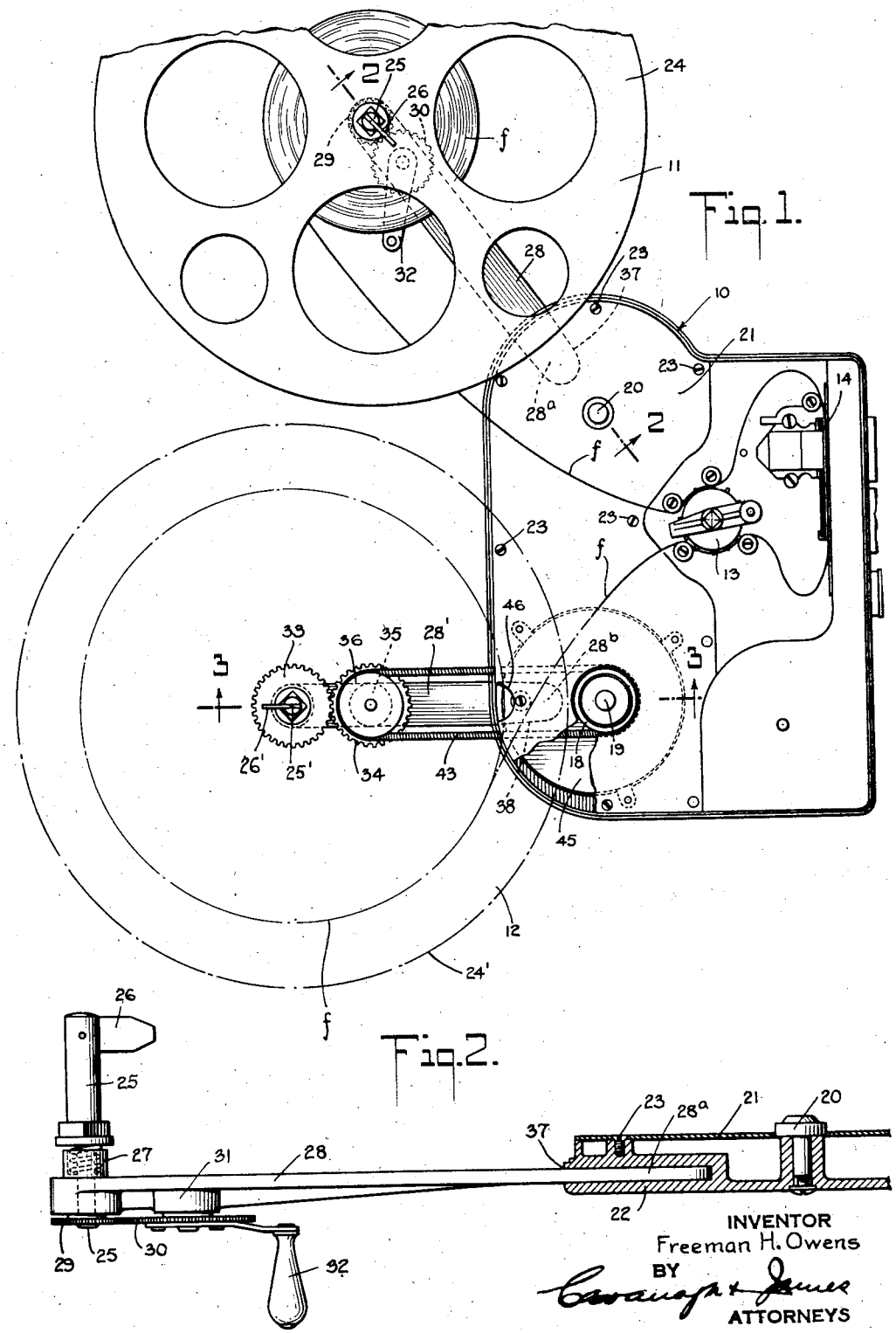

Feb. 28, 1933.  F. H. OWENS  1,899,052
COMBINED MOTION PICTURE CAMERA AND PROJECTING APPARATUS
Filed Oct. 18, 1928  2 Sheets-Sheet 1

INVENTOR
Freeman H. Owens
BY
ATTORNEYS

Feb. 28, 1933.   F. H. OWENS   1,899,052
COMBINED MOTION PICTURE CAMERA AND PROJECTING APPARATUS
Filed Oct. 18, 1928   2 Sheets-Sheet 2
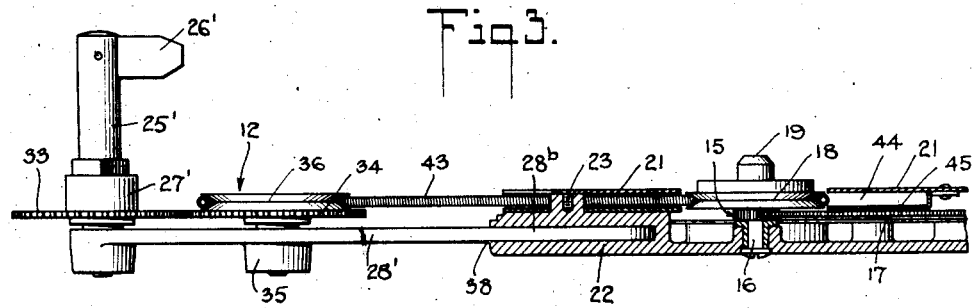
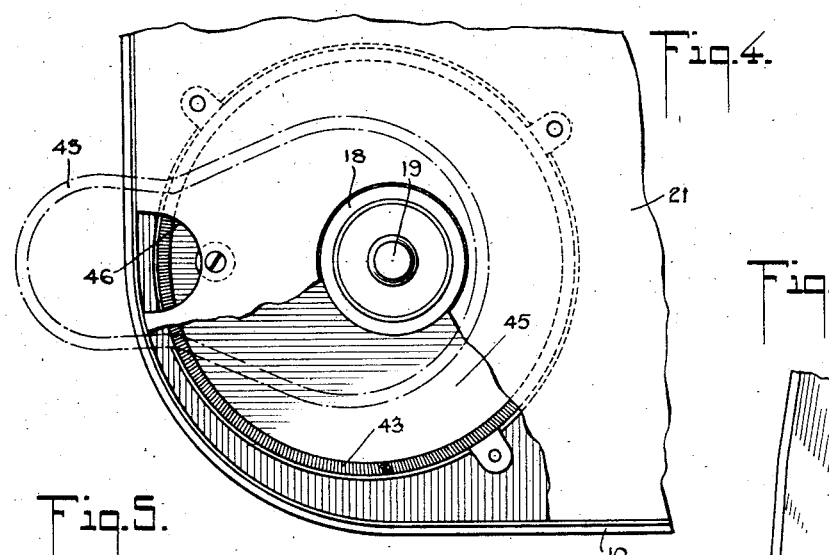
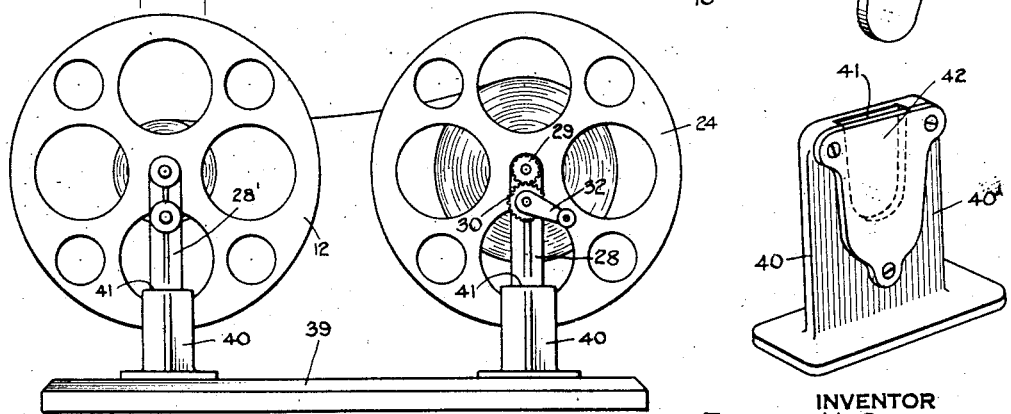
INVENTOR
Freeman H. Owens
BY
ATTORNEYS Patented Feb. 28, 1933

1,899,052

UNITED STATES PATENT OFFICE

FREEMAN H. OWENS, OF NEW YORK, N. Y.

COMBINED MOTION PICTURE CAMERA AND PROJECTING APPARATUS

Application filed October 18, 1928. Serial No. 313,310.

This invention relates to motion picture apparatus, and has special reference to the provision of improvements in a combined motion picture camera and projecting apparatus, and more particularly of the portable type.

One of the prime desiderata of my present invention centers about the provision of a combined motion picture camera and projecting apparatus embodying a compact casing or support convertible for use either as a camera or projector and film feeding and take-up reels adapted for projection use of the apparatus associated with said casing to permit rapid assembly of the casing and reels to produce an efficient and compact projecting machine organization.

A further desideratum of my present invention relates to the provision of a combined motion picture machine and film rewinding apparatus in which the main operating parts of the film rewinding apparatus are embodied in the film feeding and take-up reel structures of the motion picture machine, the design being such that the film feeding and take-up reel structures may be readily detached from the projecting machine and placed as readily in a simple stand or base to form the rewinding apparatus.

A further prime object of my present invention comprises the provision of a combined motion picture camera and projecting machine which includes an extensible means supported or housed in the machine casing and normally assuming a position disconnected from the operating means of the machine when the same is used as a camera and capable of being extended or withdrawn from the machine support or casing for connecting the operating means to a take-up reel when the machine is employed as a projector.

To the accomplishment of the foregoing and such other objects as will hereinafter appear, my invention consists in the elements and their relation one to the other, as hereinafter particularly described and sought to be defined in the claims; reference being had to the accompanying drawings which show the preferred embodiment of my invention, and in which:

Fig. 1 is a vertical side elevational view of the combined motion picture camera and projecting apparatus of the invention, Fig. 2 is a fragmentary view thereof taken on an enlarged scale in cross-section in the plane of the line 2—2, Fig. 1, Fig. 3 is a similarly enlarged view thereof taken in cross-section in the plane of the line 3—3, Fig. 1, Fig. 4 is a fragmentary view thereof taken on an enlarged scale with parts broken away, Fig. 5 is a vertical elevational view of the rewinding apparatus of the invention, and Fig. 6 is a perspective view of certain mating parts of the rewinding apparatus.

Referring now more in detail to the drawings, and having reference first to Figs. 1 to 3 thereof, the invention, to accomplish one of the aforestated objects, comprises in a generic sense a casing or support 10 for supporting or containing the operating means of the apparatus, the said casing being convertible for use either as a camera or projector, and film feeding and take-up reel structures 11 and 12 associated with the casing 10 when the latter is converted for projection use, the said casing and reel structures embodying mating means for effecting quick and efficient assembling and disassembling of the casing and reels to produce, furthermore, when assembled a compact and readily operable organization of parts.

The casing 10 preferably comprises a construction set forth in my copending application to projection machine, Serial No. 267,157, filed April 4, 1928, of which the present application is a continuation in part, the said casing comprising an enclosure for supporting the parts of the camera and projector which in Figs. 1 to 3 are shown to include a common film feeding element 13 receiving the film f from the film feeding reel 11 and feeding the same to the film take-up reel 12, the film f being threaded through the film gate 14 and through intermittent film feeding mechanism (not shown), the operating means further including a driven element 15 which may comprise a pinion fixed to a stub shaft 16 and driven from an intermediate gear 17, the said driven element being provided with a pulley 18. The driven element 15 is further provided with a stud portion 19 which, in conjunction with a second stud 20 positioned thereabove (see Fig. 1) receives the camera reel magazine (not shown), the said magazine being received in the space of the casing substantially co-extensive with the detachable plate 21. The plate 21 is detachably attachable to a wall 22 of the camera casing by means of the securing screws 23.

The reel structures 11 and 12 are substantially similar in design, except for the gear or pinion elements mounted thereon, and a description of the reel structure 11 except for these elements will therefore suffice for both reel structures 11 and 12, and the corresponding parts of reel 12 will be designated by similar and primed reference characters. The reel structure 11 comprises the reel proper 24 detachably receivable by a spindle 25 having the latching element 26, the said spindle being journalled as at 27 in a supporting member or arm 28.

The reel structure 11 is the unwinding or film feeding reel, and is provided with rewinding elements comprising a pinion 29 fixed to the spindle 25 with which meshes a gear 30 journalled in the boss 31 on the supporting arm 28, to which gear is affixed a crank handle 32. The take up reel structure 12 includes a pinion 33 fixed to the spindle 25' with which meshes a gear 34 journalled in the boss 35 of the supporting arm 28', and to which gear is affixed a pulley 36.

For accomplishing one of the main objects of the invention, the reel supporting members 28 and 28' and a part of the casing 10 are designed to define mating elements which are constructed to permit the quick assembling of the parts into the compact projector organization shown in Fig. 1 of the drawings. To accomplish this end, the free ends of the supporting arms 28 and 28' designated as 28ª and 28ᵇ respectively are made to form plug elements, and the wall 22 of the casing 10 is provided with spaced recesses 37 and 38 which define sockets for receiving the plug ends 28ª and 28ᵇ of the supporting arms with a plug or slip-in fit, as clearly shown in Figs. 1 to 3 of the drawings. Preferably the casing 10 is cut away or open on the side of the partition or plate 21, and the sockets 37 and 38 are deeply seated so that the reel structures may be slipped into the position shown in Fig. 1 of the drawings, with at least the marginal portions of the reels 24 and 24' located within the confines of casing 10, a compact organization of parts being thereby effected.

To accomplish another object of my present invention, the reel structures 11 and 12, including the supporting arms 28 and 28', are designed so that when the reel structures are removed from the machine casing 10, such reel structures may be assembled on a stand of exceedingly simple construction, with the assembly forming a rewinding apparatus. This end is accomplished by providing a stand shown in Fig. 5 of the drawings comprising a base 39 having two holders 40 and 41, each of which may be constructed, as shown in detail in Fig. 6 of the drawings, to include a standard 40' recessed at 41, which recess is covered by a plate 42 so as to form a socket similar to the sockets 37 or 38. The sockets 41 receive the plug ends 28ª and 28ᵇ of the supporting arms 28 or 28', as indicated in Fig. 6 of the drawings, to produce the assembly shown in Fig. 5 of the drawings, the assembly forming the rewinding apparatus. When assembled it will be obvious that operation of the crank handle 32 formed on one of the supporting arms as aforesaid will result in a rewinding operation. By means of this construction, therefore, it is possible to employ a very simple stand for rewinding purposes, the reel structures being, moreover, capable of being attached to and detached from the machine casing 10 and the supporting stand with rapidity and ease and by a slip-in fit and without the use of any further securing elements.

As a further factor in affording rapid interchangeable camera and projector use of the machine, I provide a means which is normally supported or housed within the casing 10 of the machine in a position disconnected from the operating means thereof and which may be quickly extended or withdrawn from the machine casing to connect the operating means of the machine to the take-up reel 12. This connecting means comprises an extensible member 43 in the form of a resilient belt preferably of a coiled spring construction, which when the machine is employed as a camera assumes the circular position shown in Fig. 4 of the drawings and which may be withdrawn from the casing in the manner shown in the dot-dash lines, Fig. 4 of the drawings, for attachment to the pulley 36 of the take-up reel structure 12, as shown in Figs. 1 and 3 of the drawings. For housing and concealing the resilient extensible connecting means 43 and holding the same in the position shown in Fig. 4 of the drawings, there is provided a cavity 44 of a width substantially that of the pulley 18 formed between the partition plate 21 and a second plate 45, the partition plate 21 being preferably provided with a notch 46 at its periphery for exposing a part of the resilient belt 43. With this construction it will be evident that when the machine is used as a camera, the belt 43 is forced into the cavity 44 and retains its assumed circular position shown in Fig. 4, and is thus disconnected from the take-up driven element 15, and that when the machine is used as a projector, the resilient belt 43 may be engaged by the finger of the operator at the notch 46 and may then be withdrawn from the cavity 44, the walls of the cavity being effective to guide the belt into engagement with the pulley 18, the driving connection with the take-up reel 12 being established by slipping the finger-engaged end of the belt 43 over the pulley 36 of the take-up reel.

The use and operation of the combined camera and motion picture projector mechanisms of my invention will in the main be fully apparent from the above detailed description thereof. It will be seen that quick conversion of the machine into a camera or projector use may be produced by withdrawing or replacing the reel structures 11 and 12 with a rapid slip-fit from and onto the casing 10 combined with a simple manipulation of the extensible or resilient belt 43, which belt is normally concealed and maintained in disconnected condition in the camera casing 10. It will further be seen that when the projector feeding and take-up reels are removed from the casing 10, they may be as quickly assembled on the stand 39 to form a rewinding apparatus in which the film is rewound for further use in the projector.

It will be further apparent that while I have shown and described my invention in its preferred form, that many changes and modifications may be made in the structure disclosed, without departing from the spirit of my invention, defined in the following claims.

I claim:

1. In a combined motion picture camera and projecting apparatus, a portable casing convertible for use as a camera or projector, film feeding and take-up reels adapted for projection use of the apparatus, each of the said reels being provided with a supporting arm, and the said casing being provided with deep-seated sockets for detachably receiving the supporting arms of said reels with a plug fit, the said casing being cut away for receiving the rim portions of said reels to produce a compact organization of parts.

2. In a combined motion picture camera and projecting apparatus, a portable casing convertible for use as a camera or a projector, film operating means in said casing including a driven element for the take-up reel of the camera or projector, film feeding and take-up reels adapted for projection use of the machine, each provided with a supporting arm one end of which defines a plug, the said casing being provided with sockets detachably receiving the plug ends of said supporting arms, and extensible means housed within the casing when the apparatus is used as a camera and adapted to be withdrawn therefrom for connecting the take-up projection reel with said driven element when the apparatus is used as a projector.

3. A film rewinding apparatus for use in conjunction with a motion picture machine including a support for the operating parts of the machine, supporting members detachably attachable to said support, when projecting the film and film feeding and take-up reels each rotatably mounted on said supporting members, said rewinding apparatus including a support provided with a pair of spaced holders for detachably receiving the aforesaid supporting members of said reels when rewinding the film.

4. The combination of a motion picture machine and film rewinding apparatus comprising a motion picture machine including a support for the operating parts of the machine and film feeding and take-up reels each provided with a supporting arm detachably attachable to said support with a slip-in fit when projecting the film, said rewinding apparatus including a support provided with a pair of spaced holding members for detachably receiving the aforesaid arms of said reels when rewinding the film.

5. The combination of a motion picture machine and film rewinding apparatus comprising a motion picture machine including a casing for the operating parts of the machine, film feeding and take-up reels each provided with a supporting arm, the said casing being provided with sockets for detachably receiving the supporting arms of said reels with a plug fit when projecting the film, one of said reels embodying means for adapting the same as the rewinding reel, and a rewinding apparatus comprising a stand provided with a pair of sockets similar to the sockets in said machine casing, the said pair of sockets also being adapted to detachably receive the arms of said reels with a plug fit when rewinding the film.

6. The combination of a motion picture machine and film rewinding apparatus comprising a motion picture machine including a support for the operating parts of the machine, film feeding and take-up reels each provided with a supporting member, the said support being provided with means for detachably receiving the supporting members of said reels with a slip-in fit when projecting the film, one of said reels embodying means for adapting the same as the rewinding reel, and a rewinding apparatus comprising a stand provided with a means similar to the means in said machine support and being also adapted to detachably receive the members of said reels with a slip-in fit when rewinding the film.

7. The combination of a motion picture machine and film rewinding apparatus comprising a motion picture machine including a support for the operating parts of the machine, film feeding and take-up reels each rotatably mounted on a supporting member, the said support being provided with means for detachably receiving the supporting members of said reels when projecting the film, and a rewinding apparatus comprising a stand provided with a means similar to the means in said machine support and also being adapted to detachably receive the supporting members of said reels when rewinding the film.

8. In a combined motion picture camera and projecting apparatus, a portable support convertible for use as a camera or a projector, camera and projector mechanism within said support, film operating means on said support including a driven element for the take-up reel of the camera or projector, a film take-up reel for projection use of the machine, and a member on said support normally disconnected from said driven element when the apparatus is used as a camera and movable for connecting the take-up projection reel with said driven element when the apparatus is used as a projector.

9. In a combined motion picture camera and projecting apparatus, a portable support convertible for use as a camera or a projector, film operating means on said support including a driven element for the take-up reel of the camera or projector, a film take-up reel for projection use of the machine, and a flexible member housed on said support normally assuming a condition disconnected from said driven element when the apparatus is used as a camera and movable for connecting the take-up projection reel with said driven element when the apparatus is used as a projector.

10. In a combined motion picture camera and projecting apparatus, a portable casing convertible for use as a camera or a projector, film operating means in said casing including a driven element for the take-up reel of the camera or projector, a take-up reel adapted for projection use of the machine, and extensible means housed within the casing when the apparatus is used as a camera and adapted to be withdrawn therefrom when the apparatus is used as a projector for connecting the take-up projection reel with said driven element.

11. In a combined motion picture camera and projecting apparatus, a portable casing convertible for use as a camera or a projector, film operating means in said casing including a driven element for the take-up reel of the camera or projector, a take-up reel adapted for projection use of the machine, the take-up reel and driven element being provided with pulleys, and a resilient extensible means housed within the casing when the apparatus is used as a camera and normally assuming a condition disconnected from the driven element and adapted to be withdrawn from the casing when the apparatus is used as a projector for connecting the pulley of the take-up projection reel and said driven element.

12. A combined motion picture camera and projecting apparatus comprising a relatively small compact portable casing convertible for use either as a camera or as a projector, mechanism within said casing for controlling and feeding film either for exposure or projection, support means within said casing for relatively small film feeding and take-up reels for camera use of the apparatus, relatively large film feeding and take-up reels for projection use of the apparatus, each of said projection reels being provided with an elongated extension arm for supporting the same externally of and in operative relation to the casing, said casing being provided with sockets for detachably receiving the ends of the supporting arms of the reels with a plug fit, and extensible means for connecting the take-up projection reel with the mechanism in the casing, whereby the small casing conveniently houses all of the apparatus when used as a camera, but is readily equipped with large external projection reels when used as a projector.

13. A combined motion picture camera and projecting apparatus comprising a relatively small compact portable casing convertible for use either as a camera or as a projector, mechanism within said casing for controlling and feeding film either for exposure or projection, support means within said casing for relatively small film feeding and take-up reels for camera use of the apparatus, means for driving the camera take-up reel, relatively large film feeding and take-up reels for projection use of the apparatus, each of said projection reels being provided with an elongated extension arm for supporting the same in operative relation to the casing, said casing being provided with deep-seated sockets for detachably receiving the ends of the supporting arms of the reels with a plug fit, and extensible means for connecting the take-up projection reel with the driving means for the take-up camera reel, whereby the apparatus is conveniently small when used as a camera, but is readily equipped with large projection reels when used as a projector.

Signed at New York in the county of New York and State of New York this 3rd day of Oct. A. D. 1928.

FREEMAN H. OWENS.